(12) United States Patent
Matsuoka et al.

(10) Patent No.: US 8,115,521 B2
(45) Date of Patent: Feb. 14, 2012

(54) FREQUENCY ERROR DETECTING CIRCUIT, FREQUENCY ERROR DETECTING METHOD, AND FREQUENCY CORRECTING CIRCUIT

(75) Inventors: Hidehiro Matsuoka, Kanagawa (JP); Masami Aizawa, Kanagawa (JP); Tatsuhisa Furukawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 184 days.

(21) Appl. No.: 12/706,949

(22) Filed: Feb. 17, 2010

(65) Prior Publication Data

US 2010/0207670 A1    Aug. 19, 2010

(30) Foreign Application Priority Data

Feb. 18, 2009   (JP) ................. 2009-035756

(51) Int. Cl.
*H04B 1/16*   (2006.01)
(52) U.S. Cl. ...................................... 327/113
(58) Field of Classification Search .................. 327/113, 327/39–49
See application file for complete search history.

(56) References Cited

U.S. PATENT DOCUMENTS 6,545,516 B2 * 4/2003 Ylamurto et al. ............. 327/113
7,057,426 B2 * 6/2006 Yamaji et al. ................. 327/113

FOREIGN PATENT DOCUMENTS

JP   2005-160116   6/2005
JP   2006-108817   4/2006

OTHER PUBLICATIONS

Meyr, et al. Digital Communication Receivers, Synchronization, Channel Estimation, and Signal Processing, A Wiley-Interscience Publication, pp. 453-456.

* cited by examiner

*Primary Examiner* — Hai L Nguyen
(74) *Attorney, Agent, or Firm* — Turocy & Watson, LLP (57) ABSTRACT

A frequency error detecting circuit includes: an oscillator; a frequency converting unit for a received signal on the basis of the oscillation output and output the received signal; a time-to-frequency converting unit configured to convert the output of the frequency converting unit into a frequency domain signal; a frequency shift determining unit configured to determine presence or absence of a frequency shift between an output frequency of the frequency converting unit and a predetermined carrier frequency; and a control unit configured to repeat frequency conversion processing and time-to-frequency conversion processing while controlling an oscillation frequency of the oscillator on the basis of a determination result of the frequency shift determining unit and cause the output frequency of the frequency converting unit to converge on a predetermined value to thereby detect a frequency error between the frequency of the received signal and the predetermined carrier frequency.

20 Claims, 5 Drawing Sheets

| k | PRESENCE OR ABSENCE OF FREQUENCY SHIFT EQUAL TO OR LARGER THAN bin INTERVAL | INCREASE OR DECREASE AMOUNT OF NCO FREQUENCY | INCREASE OR DECREASE AMOUNT OF OUTPUT CENTER FREQUENCY OF MULTIPLIER | ACTUAL CORRECTION AMOUNT AFTER STEP S9 | DETECTION VALUE OF FREQUENCY SHIFT AFTER STEP S9 |
|---|---|---|---|---|---|
|  | ABSENT | +250kHz | +275kHz | +250kHz | +0kHz |
| 1 | PRESENT | −125kHz | +150kHz | +125kHz | +125kHz |
| 2 | ABSENT | +62.5kHz | +212.5kHz | +187.5kHz | +62.5kHz |
| 3 | ABSENT | +31.25kHz | +243.75kHz | +218.75kHz | +31.25kHz |
| 4 | ABSENT | +15.625kHz | +259.375kHz | +234.375kHz | +15.625kHz |
| 5 | PRESENT | −7.8125kHz | +251.5625kHz | +226.5625kHz | +23.4375kHz |
| 6 | PRESENT | −3.90625kHz | +247.656525kHz | +222.65625kHz | +27.34375kHz |
| 7 | ABSENT | +1.953125kHz | +249.609375kHz | +224.609375kHz | +25.390625kHz |

FREQUENCY ERROR DETECTING CIRCUIT, FREQUENCY ERROR DETECTING METHOD, AND FREQUENCY CORRECTING CIRCUIT

CROSS-REFERENCE TO RELATED APPLICATIONS

This application is based upon and claims the benefit of priority from the prior Japanese Patent Application No. 2009-35756, filed on Feb. 18, 2009; the entire contents of which are incorporated herein by reference.

BACKGROUND OF THE INVENTION

1. Field of the Invention

The present invention relates to a frequency error detecting circuit and method and a frequency correcting circuit configured to enable quick carrier frequency acquisition with a small circuit size.

2. Description of the Related Art

In a general broadcast system, a received radio signal is converted into a low-frequency signal or a baseband signal by a tuner functioning as an analog circuit in a high-frequency (RF) band, A/D-converted, and then subjected to demodulation and decoding processing. In the tuner, since VCOs (Voltage Controlled Oscillators) used in a transmitter and a receiver are different, a carrier frequency offset (hereinafter referred to as "frequency error") occurs between the transmitter and the receiver. The carrier frequency error causes catastrophic errors in digital demodulation processing. Therefore, in the receiver, AFC (Automatic Frequency Control) for correcting the carrier frequency error is adopted.

In general, in a broadcasting transmitter and a communication base station, a high precision oscillator with a small frequency error is used. On the other hand, on the receiver side, a small and inexpensive oscillator is often used. Frequency accuracy of such an oscillator is relatively low. Because of the low frequency accuracy, depending on adjustment of the tuner, the carrier frequency error is relatively large with respect to signal bandwidth between the transmitter and the receiver. Therefore, it is desirable that the AFC can correct the error even when the relatively large carrier frequency error occurs in this way.

As a technique for correcting such a carrier frequency error, there is a technique disclosed in Japanese Patent Application Laid-Open Publication No. 2006-108817 (Document 1) and Japanese Patent Application Laid-Open Publication No. 2005-160116 (Document 2). The technique disclosed in Documents 1 and 2 is a technique for extracting a known signal sequence included in a received signal and detecting an inter-symbol phase difference using characteristics (repetition, uniqueness, etc.) of the extracted signal sequence to detect a frequency error.

However, the technique disclosed in Documents 1 and 2 cannot be used in a received signal not including a known signal sequence. When the technique is adopted in an apparatus configured to receive a broadcast wave unknown whether it is a single carrier system or a multi-carrier system, it takes long time to estimate the frequency error.

Meanwhile, Heinrich Meyr, Marc Moeneclaey and Stefan A. Fechtel, "Digital Communication Receivers," A Wiley-Interscience Publication, pp. 453-456 (Document 3) discloses a technique for detecting a carrier frequency error according to a spectrum analysis method without using a known signal sequence. In the technique, a received signal is subjected to Fourier transform to observe a frequency spectrum and a shift of the frequency spectrum from a target center frequency is measured to detect a frequency error. By using such a spectrum analysis method, it is possible to detect a carrier frequency error even when a known signal sequence is not included in a received signal.

However, in the technique disclosed in Document 3, the detection range of the frequency error and the frequency resolution depend on the number of points of a Fourier transform circuit. When it is attempted to set a sufficient frequency detection range while enabling error detection at sufficient frequency resolution, it is necessary to increase the number of points of a Fourier transform circuit, for example, to 4096. Also the large number of points of the Fourier transform increases a circuit size and requires a large number of samples for error detection. Therefore, it takes long time to capture the number of samples required for the error detection and acquisition time for frequency synchronization is extended.

BRIEF SUMMARY OF THE INVENTION

A frequency error detecting circuit according to an aspect of the present invention includes: an oscillator configured to output a frequency-variable oscillation output; a frequency converting unit configured to convert a carrier frequency of a received signal on the basis of the oscillation output and output the received signal; a time-to-frequency converting unit configured to convert the output of the frequency converting unit from a time domain signal into a frequency domain signal; a frequency shift determining unit configured to determine, on the basis of an output of the time-to-frequency converting unit, presence or absence of a frequency shift between an output frequency of the frequency converting unit and a predetermined carrier frequency; and a control unit configured to repeat frequency conversion processing of the frequency converting unit and conversion processing of the time-to-frequency converting unit while controlling an oscillation frequency of the oscillator on the basis of an output of the frequency shift determining unit and cause the output frequency of the frequency converting unit to converge on a predetermined value to thereby detect a frequency error between the frequency of the received signal and the predetermined carrier frequency on the basis of the oscillation frequency of the oscillator.

A frequency correcting circuit according to another aspect of the present invention includes: an oscillator configured to output a frequency-variable oscillation output; a frequency converting unit configured to convert a frequency of a received signal on the basis of the oscillation output and output the received signal; a time-to-frequency converting unit configured to convert the output of the frequency converting unit from a time domain signal into a frequency domain signal; a frequency shift determining unit configured to determine, on the basis of an output of the time-to-frequency converting unit, presence or absence of a frequency shift between an output frequency of the frequency converting unit and a predetermined carrier frequency; and a control unit configured to repeat, in a frequency error detection period, frequency conversion processing of the frequency converting unit and conversion processing of the time-to-frequency converting unit while controlling an oscillation frequency of the oscillator on the basis of a determination result of the frequency shift determining unit and cause the output frequency of the frequency converting unit to converge on a predetermined value to thereby detect a frequency error between the frequency of the received signal and the predetermined carrier frequency on the basis of the oscillation frequency of the oscillator, and, in a tracking period, control the oscillation output on the basis of the detected frequency error to thereby correct the frequency error of the output of the frequency converting unit.

A frequency error detecting method according to still another aspect of the present invention includes: subjecting a received signal to frequency conversion processing on the basis of an oscillation output from an oscillator; subjecting the received signal subjected to the frequency conversion processing to time-to-frequency conversion processing to convert the received signal from a time domain signal into a frequency domain signal; determining, on the basis of the frequency domain signal, presence or absence of a frequency shift between an output frequency of the received signal after the frequency conversion processing and a predetermined carrier frequency; and repeating the frequency conversion processing and the time-to-frequency conversion processing while controlling an oscillation frequency of the oscillator on the basis of a determination result of presence or absence of the frequency shift and causing the output frequency of the received signal after the frequency conversion processing to converge on a predetermined value to thereby detect a frequency error between the frequency of the received signal and the predetermined carrier frequency on the basis of the oscillation frequency of the oscillator.

DETAILED DESCRIPTION OF THE INVENTION

Figure 1:
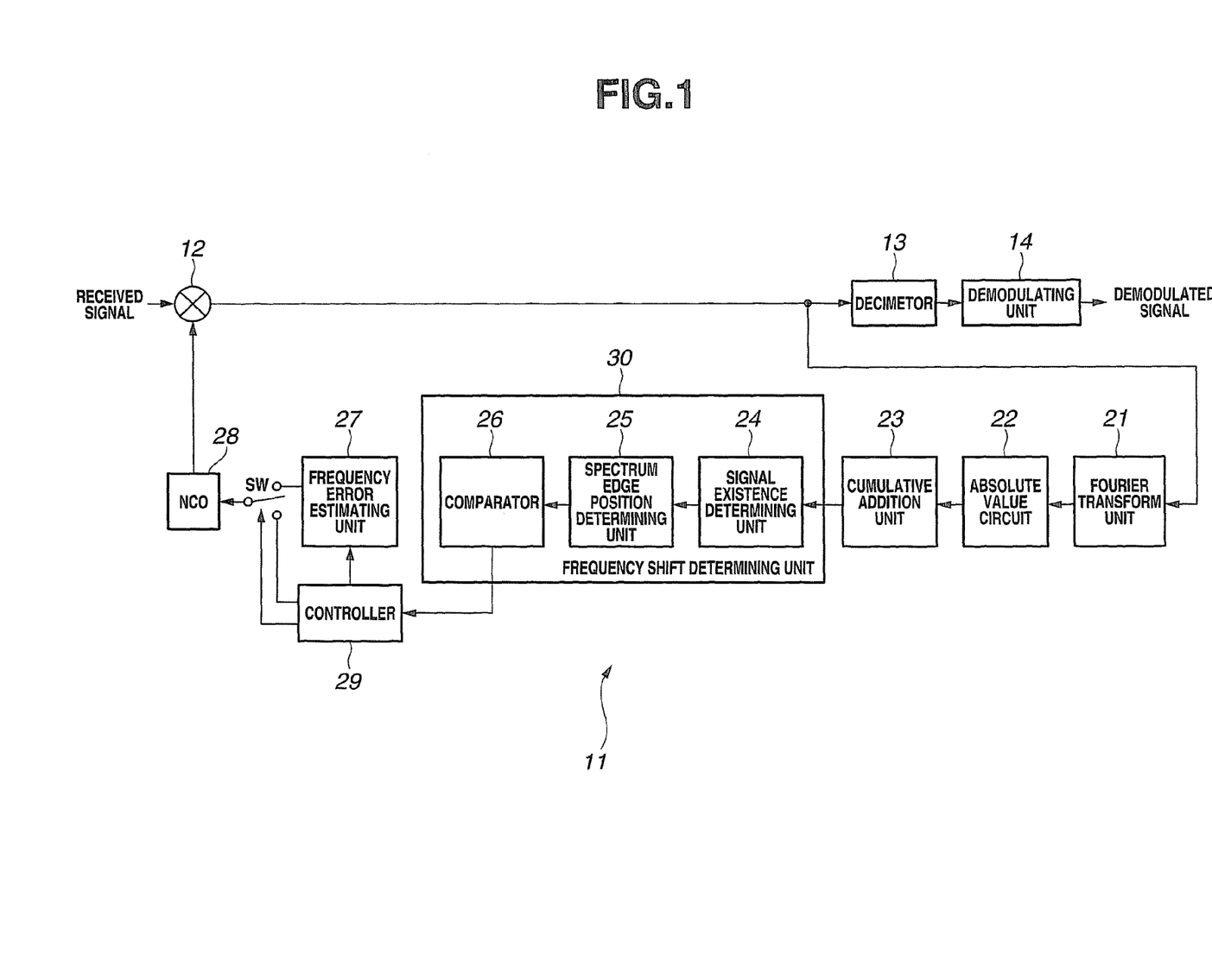
FIG. 1 is a block diagram showing a frequency correcting circuit including a frequency error detecting circuit according to an embodiment of the present invention.

An embodiment of the present invention is explained in detail below with reference to the accompanying drawings. FIG. 1 is a block diagram showing a frequency correcting circuit including a frequency error detecting circuit according to an embodiment of the present invention.

As shown in FIG. 1, a received signal is input to the frequency correcting circuit. The received signal is a radio frequency band signal, a frequency-converted signal with intermediate frequency or a baseband signal. The received signal input to the frequency correcting circuit includes a carrier frequency error. For improvement of performance of demodulation processing, in some cases, the received signal is oversampled. In the present embodiment, the received signal is explained as being oversampled.

The received signal is given to a multiplier 12 functioning as a frequency converting unit. The multiplier 12 receives an oscillation output of an NCO (Numerical Controlled Oscillator) 28 to be explained below and performs frequency conversion according to multiplication of the received signal and the oscillation output of the NCO 28. As explained later, the NCO 28 outputs a sine wave having a corrected frequency. An output of the multiplier 12 is input to a decimator 13 and a Fourier transform unit 21. The decimator 13 resamples the output of the multiplier 12 with lower sampling rate and outputs to a demodulating unit 14. The demodulating unit 14 demodulates the decimated received signal and outputs a demodulated signal.

In the present embodiment, a frequency error detecting circuit 11 includes the multiplier 12, the Fourier transform unit 21 functioning as a time-to-frequency converting unit, an absolute value circuit 22, a cumulative addition unit 23, a signal existence determining unit 24, a spectrum edge position determining unit 25, a comparator 26, a frequency error estimating unit 27, the NCO 28 functioning as an oscillator, a switch SW, and a controller 29. The frequency error detecting circuit 11 detects a carrier frequency error in a frequency error detection period. During a tracking period, when the detected frequency error is set in the NCO 28, the multiplier 12 corrects the carrier frequency error.

In the present embodiment, even in the frequency error detection period, the multiplier 12 performs frequency correction according to the multiplication of the oscillation output from the NCO 28 and the received signal. The frequency error detecting circuit 11 performs detection of a frequency shift concerning the output of the multiplier 12 subjected to the frequency correction and repeats the detection of a frequency shift while controlling an oscillation frequency of the NCO 28 on the basis of a detection result. As explained later, the frequency error detecting circuit 11 controls the oscillation frequency of the NCO 28 with frequency accuracy equal to or lower than a frequency based on the number of points of the Fourier transform unit 21. This makes it possible to perform frequency error detection with high frequency resolution while reducing the number of points of the Fourier transform unit 21.

Specifically, in the present embodiment, the number of points of the Fourier transform unit 21 is comparably small to realize sufficient accuracy and range to detect the carrier frequency error. The Fourier transform unit 21 subjects a time domain signal as an output of the multiplier 12 to Fourier transform to thereby convert the time domain signal into the frequency domain signal and output the signal to the absolute value circuit 22. The absolute value circuit 22 calculates an absolute value of frequency components (bins) received from the Fourier transform unit 21 and outputs the absolute value to the cumulative addition unit 23. The cumulative addition unit 23 cumulatively adds up, for each of frequency components, outputs of the absolute value circuit 22.

An output of the cumulative addition unit 23 is given to the signal existence determining unit 24. The signal existence determining unit 24 compares a threshold value with each of output frequency components of the cumulative addition unit 23 and determines that the signal is present if the output frequency component is larger than the threshold value, and outputs the determination result to the spectrum edge position determining unit 25. The spectrum edge position determining unit 25 determines the upper and lower edges of the output frequency spectrum of the cumulative addition unit 23 according to the determination result of the signal existence determining unit 24, and outputs the determination result to the comparator 26.

The comparator 26 calculates, according to comparison of the determination result of the frequency position of the spectrum edge and a frequency position based on a predetermined carrier frequency band, a shift between the frequency band of the output of the cumulative addition unit 23 and the predetermined carrier frequency band, i.e., a frequency shift between a center frequency of the output of the multiplier 12 and the predetermined carrier center frequency. The comparator 26 detects, with a frequency difference (hereinafter referred to as bin interval) between frequency components of the output of the Fourier transform unit 21 set as a unit, a shift between the frequency band and the predetermined carrier frequency band. The comparator 26 outputs presence or absence of a frequency shift, a shift amount in bin interval unit, and a direction of a shift (if the frequency band is shifted in a plus or minus direction compared to the predetermined carrier frequency band) to the controller 29 as a comparison result. The comparator 26 cannot detect a frequency shift within the bin interval.

The signal existence determining unit 24, the spectrum edge position determining unit 25, and the comparator 26 configure a frequency shift determining unit 30. Since the number of points of the Fourier transform unit 21 is small, the frequency shift determining unit 30 cannot detect a frequency error at sufficient detection accuracy by performing the detection of the frequency shift once. Therefore, in the present embodiment, frequency offset is forcibly performed at several times so that the frequency shift determining unit 30 can detect any frequency shift of the output center frequency of the multiplier 12. The center frequency of the multiplier 12 is caused to converge on a predetermined value while a frequency offset amount is changed repeatedly through trial and error on the basis of the determination result of the frequency shift determining unit 30. A frequency shift is estimated according to the frequency correction amount at the time when the center frequency converges on the predetermined value.

Specifically, the controller 29 determines, on the basis of a comparison result of the comparator 26, an oscillation frequency to be set in the NCO 28 and notifies, via the switch SW, the NCO 28 of the oscillation frequency. The controller 29 outputs information concerning the determined oscillation frequency to the frequency error estimating unit 27. In the present embodiment, the controller 29 sets an oscillation frequency corresponding to a shift amount in the NCO 28 when it is indicated by a first comparison result of the comparator 26, in which the oscillation frequency of the NCO 28 is 0, that the center frequency of the output of the multiplier 12 shifts. As explained above, in the present embodiment, the offset frequency is set to be relatively large with the frequency resolution corresponding to the frequency defined by the number of points of the Fourier transform unit 21 so as to enable the frequency shift determining unit 30 to detect the frequency shift. Consequently, the frequency shift can be detected by the second comparison processing of the comparator 26.

The controller 29 performs frequency correction to enable detection of the frequency shift. Specifically, thereafter, the controller 29 repeats the frequency error determination while increasing or decreasing the oscillation frequency of the NCO 28 according to the comparison result. The controller 29 sets an amount of increase or decrease of the oscillation frequency of the NCO 28 to a value smaller than the amount of increase or decrease during the last control, for example, ½. When this processing is repeated, the center frequency of the output of the multiplier 12 converges on the predetermined value. The frequency error estimating unit 27 receives the amount of increase or decrease of the oscillation frequency of the NCO 28 from the controller 29 and cumulatively adds up amounts of increase or decrease. As a result of several trial of the cumulative addition, the frequency error estimating unit 27 finally estimates a carrier frequency error and outputs an estimation result to the NCO 28 via the switch SW.

The controller 29 determines the number of times of repetition of the frequency error determination. While the frequency error determination is repeated by a predetermined number of times, the amount of increase or decrease of the oscillation frequency of the NCO 28 gets equal to or smaller than the predetermined value. In other words, the accuracy of the cumulative addition value from the frequency error estimating unit 27 becomes higher gradually. As a result, the carrier frequency error is calculated at predetermined frequency resolution. When the number of times of repetition of the frequency error determination reaches the predetermined number of times, the controller 29 controls the switch SW to give the estimation result of the frequency error, which is output from the frequency error estimating unit 27, to the NCO 28. In this way, thereafter, the NCO 28 oscillates at the oscillation frequency corresponding to the carrier frequency error. The multiplier 12 corrects the carrier frequency error from the received signal and outputs the received signal to the decimator 13.

Not only an FFT (Fast Fourier Transform) circuit but also a DFT (Discrete Fourier Transform) circuit and other circuits can be used as the Fourier transform unit 21.

Operation in the embodiment configured as explained above is explained below with reference to FIGS. 2A to 5. FIGS. 2A, 2B, 3A, and 3B are explanatory diagrams for explaining a frequency spectrum of a received signal and an output of the Fourier transform unit 21. FIG. 4 is a flowchart showing an operation flow of frequency error detection.

Figure 2A:
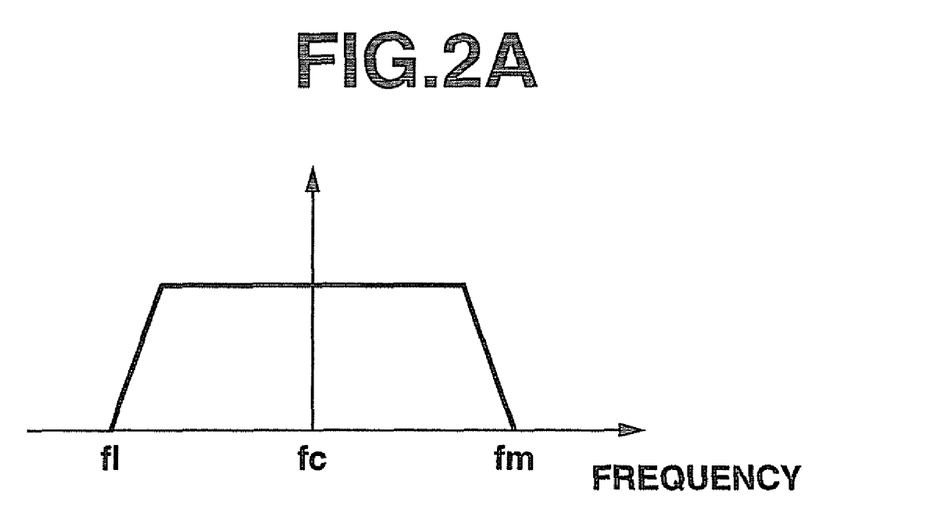
FIGS. 2A and 2B are explanatory diagrams for explaining a frequency spectrum of a received signal.
Figure 2B:
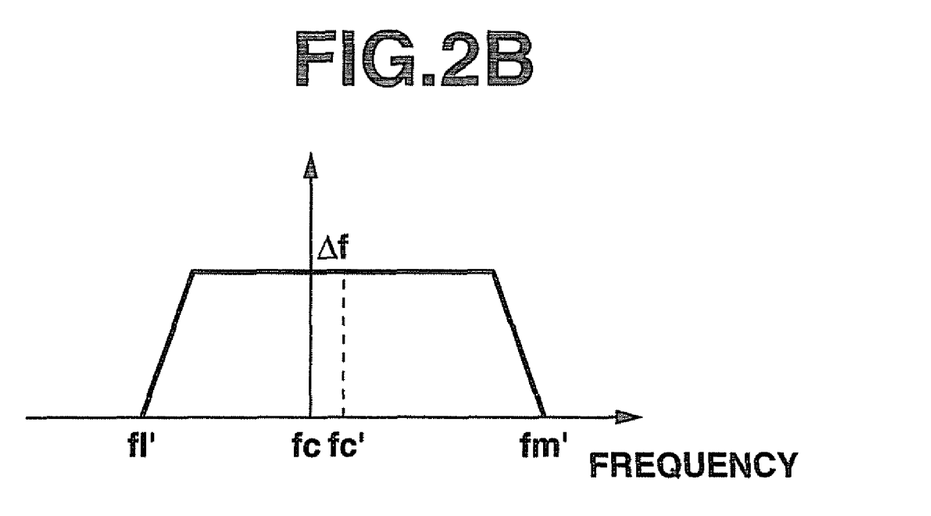
Figure 3A:
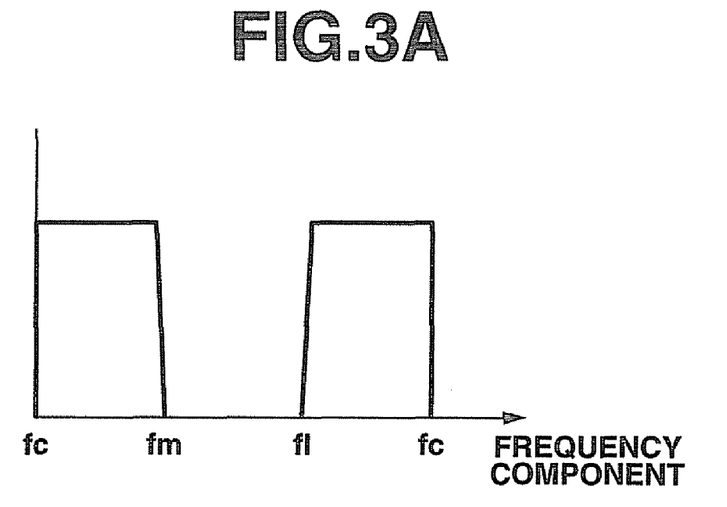
FIGS. 3A and 3B are explanatory diagrams for explaining an output of a Fourier transform unit 21.
Figure 3B:
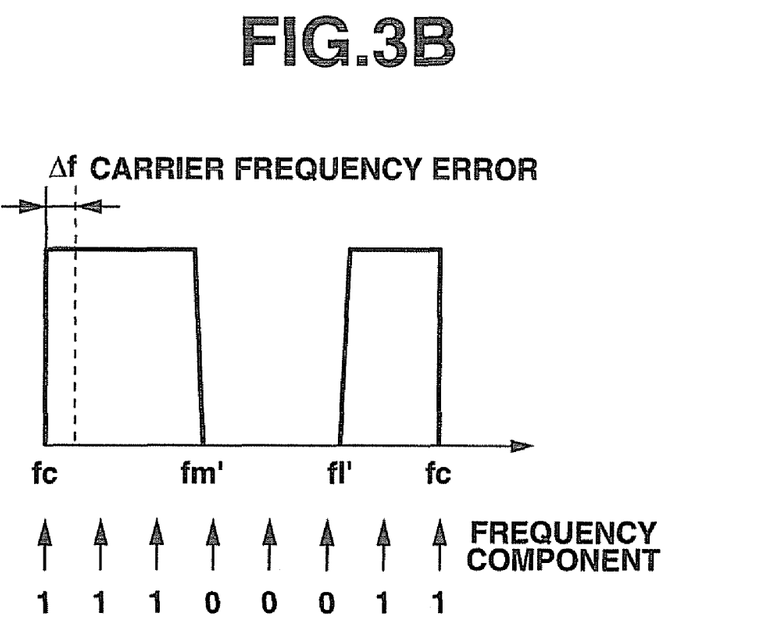
Figure 4:
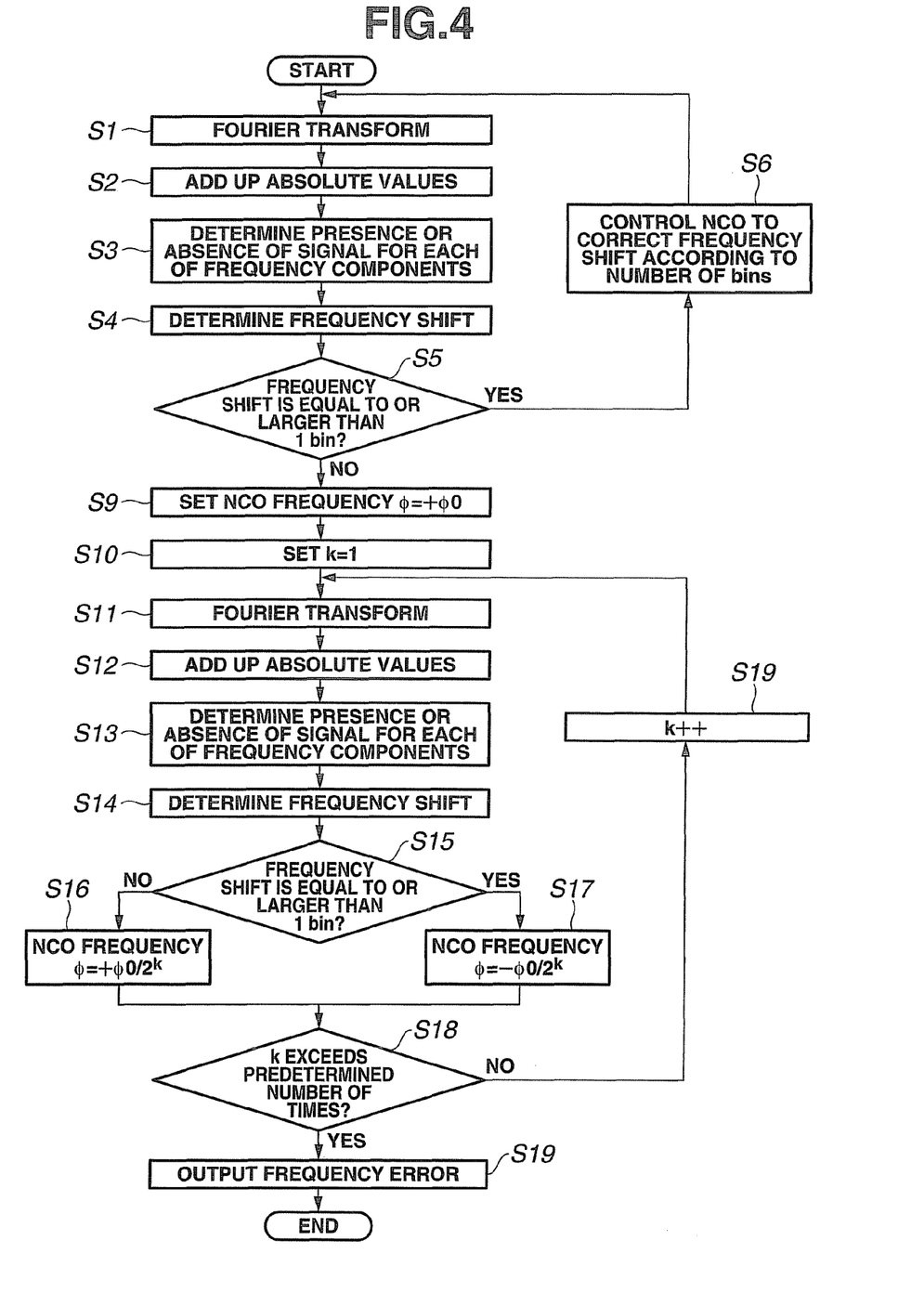
FIG. 4 is a flowchart showing an operation flow of frequency error detection.

FIG. 2A shows a spectrum of a received signal without a carrier frequency error and FIG. 3A shows a result obtained by subjecting the signal shown in FIG. 2A to Fourier transform in the Fourier transform unit 21. FIGS. 2A and 3A show an example in which a center frequency is fc. FIG. 2B shows an example in which a carrier frequency error occurs in the received signal shown in FIG. 2A. As shown in FIGS. 2A and 2B, the center frequency shifts by Δf. In this case, a Fourier transform result of the multiplier 12 is as shown in FIG. 3B.

The frequency correcting circuit shown in FIG. 1 is configured to calculate a frequency error in the frequency error detection period and sets the calculated frequency error in the NCO 28 to thereby obtain the received signal subjected to frequency correction by the multiplier 12. The frequency error is detected by causing the output of the multiplier 12 to converge on the predetermined value while repeating the frequency correction with the multiplier 12.

Specifically, in the frequency error detection period, the received signal is given to the multiplier 12. First, the multiplier 12 directly outputs the received signal without performing the frequency correction. The output of the multiplier 12 is supplied to the Fourier transform unit 21. In step S1 in FIG. 4, the Fourier transform unit 21 converts the signal in a time domain from the multiplier 12 into a signal in a frequency domain and outputs the signal to the absolute value circuit 22. A general Fourier transform circuit outputs an output corresponding to a center frequency component of an input signal at the beginning, and then sequentially outputs the outputs of frequency components from the center frequency to the maximum frequency of the input signal. After outputting the output corresponding to the maximum frequency component, the Fourier transform circuit outputs an output corresponding to the minimum frequency component and then sequentially outputs the frequency components from the minimum frequency to the center frequency. The Fourier transform circuit outputs frequency components corresponding to the number of points. FIGS. 3A and 3B show examples of the output.

When the bandwidth of the received signal is sufficiently narrow compared with the output bandwidth of the Fourier transform, an interval between frequencies fm and fl shown in FIG. 3A increases. When the received signal is oversampled, the bandwidth of the input signal to the Fourier transform increases and the interval between the frequencies fm and fl shown in FIG. 3A increases. FIGS. 2A, 2B, 3A, and 3B show examples in which the received signal is oversampled.

Frequency components of which number is the same as the number of points are output from the Fourier transform unit 21. The frequency components are calculated to absolute values by the absolute value circuit 22 and each of the absolute value of the frequency components is cumulatively added up by the cumulative addition unit 23 (step S2). The cumulative addition values are reset every time the oscillation frequency of the NCO 28 is updated. Although the absolute values of the frequency components of the Fourier transform unit 21 are added up in this example, the power values of the frequency components may be added up alternatively.

In the next step S3, the signal existence determining unit 24 compares a cumulative value with a predetermined threshold and determines, for each of the frequency components, whether a desired signal is present. The spectrum edge position determining unit 25 can obtain, in frequency component unit, a frequency position of a signal (spectrum) presence or absence boundary on the basis of the determination result (step S4). When the number of times of the cumulative addition is set large in step S2, determination errors can be reduced. Conversely, the cumulative addition does not have to be performed when the received signal is not affected by multi-path and noise and has sufficiently large received signal power.

The comparator 26 compares the frequency position of the signal presence or absence boundary as the determination result from the spectrum edge position determining unit 25 with the frequency position of the predetermined spectrum edge to thereby determine the frequency shift of the output of the multiplier 12.

It is assumed that the number of points of the Fourier transform unit 21 is, for example, eight and the frequency components are components of timing indicated by arrows shown in FIG. 3B. It is assumed that a determination result of the signal existence determining unit 24 is as shown in FIG. 3B with signal presence represented as "1" and signal absence represented as "0". The determination result is represented as, for example, {11100011}. The spectrum edge position determining unit 25 can determine a spectrum edge according to positions of "1" and "0" of the determination result and can represent the spectrum edge as, for example, {3, 7} indicating the position of "1". On the other hand, it is assumed that a determination result with respect to the Fourier transform for the known carrier frequency shown in FIG. 3A is, for example, {11000111}. The predetermined spectrum edge in this case can be represented as {2, 6}. Here in the expression of {3, 7}, the lower and upper limit frequency position where signals of the frequency components are present is 3 and 7, respectively.

Specifically, in the example shown in FIGS. 2A, 2B, 3A, and 3B, a frequency shifts can be determined by comparing the lower limit frequency position (3) (or the upper limit frequency position (7)) where the received signal is present among the frequency components of the Fourier transform result for the output of the multiplier 12 and the lower limit frequency position (2) (or the upper limit frequency position (6)) of the known carrier frequency.

The comparator 26 may determine a frequency shift according to other methods. For example, the comparator 26 may compare the sum of upper and lower limit frequency positions of the received signal with that of the predetermined spectrum, or may compare the average of the center frequency positions of the received signal with that of the predetermined spectrum. In other words, the comparator 26 only has to be capable of determining a frequency shift between the center frequency of the received signal bandwidth and the predetermined carrier frequency. The determination result of the comparator 26 is output to the controller 29.

In step S5, the controller 29 determines whether there is a frequency shift equal to or larger than 1 bin interval that can be detected by the comparator 26. When a determination result of the frequency shift is equal to or larger than 1 bin interval, the controller 29 advances the processing to step S6. The controller 29 sets an oscillation output of a frequency corresponding to the bin interval of the frequency shift in the NCO 28 and outputs the set value to the frequency error estimating unit 27. The NCO 28 outputs the oscillation output to the multiplier 12. The multiplier 12 corrects a frequency error of the received signal according to multiplication of the received signal and the output of the NCO 28.

The processing in steps S1 to S5 is repeated. Since the frequency shift equal to or larger than 1 bin interval is corrected in step S6, in step S5 executed for the second time, the controller 29 determines that the frequency shift is smaller than 1 bin interval. The controller 29 advances the processing to step S9.

In the present embodiment, the number of points of the Fourier transform unit 21 is relatively small and 1 bin interval is a relatively large value. Therefore, a frequency shift often cannot be detected in step S4. In this case, in step S5 executed for the first time, the controller 29 determines that the frequency shift is smaller than 1 bin interval. The controller 29 advances the processing to step S9.

Let us consider the case that the comparator 26 gives the controller 29 a determination result that the frequency shift equal to or larger than 1 bin interval has not occurred. In step S9, the controller 29 increases the oscillation frequency of the NCO 28 by an initial value $\phi 0$ Hz and sets a variable k for giving the number of times of following detection of frequency shifts to 1. Thereafter, a frequency shift is detected in steps S11 to S14. Processing in steps S11 to S14 is the same as the processing in steps S1 to S4.

In step S9, the controller 29 sets the initial value $\phi 0$ to, for example, a value smaller than 1 bin interval, for example, a half value of 1 bin interval. If the correction amount is given, when the comparator 26 detects the frequency shift equal to or larger than 1 bin interval in step S14, it means that an actual frequency shift is a value between 0.5 bin interval and 1 bin interval. On the other hand, when the comparator 26 does not detect the frequency shift equal to or larger than 1 bin interval in step S14, it means that an actual frequency shift is a value between 0 bin interval and 0.5 bin interval. Therefore, thereafter, it is possible to adjust the correction amount to converge on the carrier frequency error and increase detection accuracy for a frequency error by increasing or decreasing the correction amount and gradually reducing the increased or decreased correction amount (an increase or reduction amount) to a smaller value according to a comparison result of the comparator 26.

In step S6, when the frequency shift occurs in a positive direction, the frequency shift is corrected by the number of bins and, when the frequency shift occurs in a negative direction, the frequency shift is corrected by (the number of bins+1). This makes it possible to cause all frequency shifts based on step S9 to occur in the positive direction and perform the processing after step S9 in the same manner. In step S9, the controller 29 may switch whether the initial value $\phi 0$ is set to a plus correction amount or set to a minus correction amount according to whether a direction of the frequency shift is the positive direction or the negative direction.

A value of the initial value $\phi 0$ depends on the number of points L of the Fourier transform unit 21, a signal bandwidth BW, the number of times of oversampling M, a determination threshold for determining signal existence, and the like. As an example, a following Equation (1) can be adopted as φ0. Although φ0 can take various values, the detection accuracy for a frequency error can be improved at shorter time when φ0 is equal to or smaller than 1 bin interval.

$$\phi 0 = BW \times M/L/2 \qquad (1)$$

Specific Example

Figure 5:
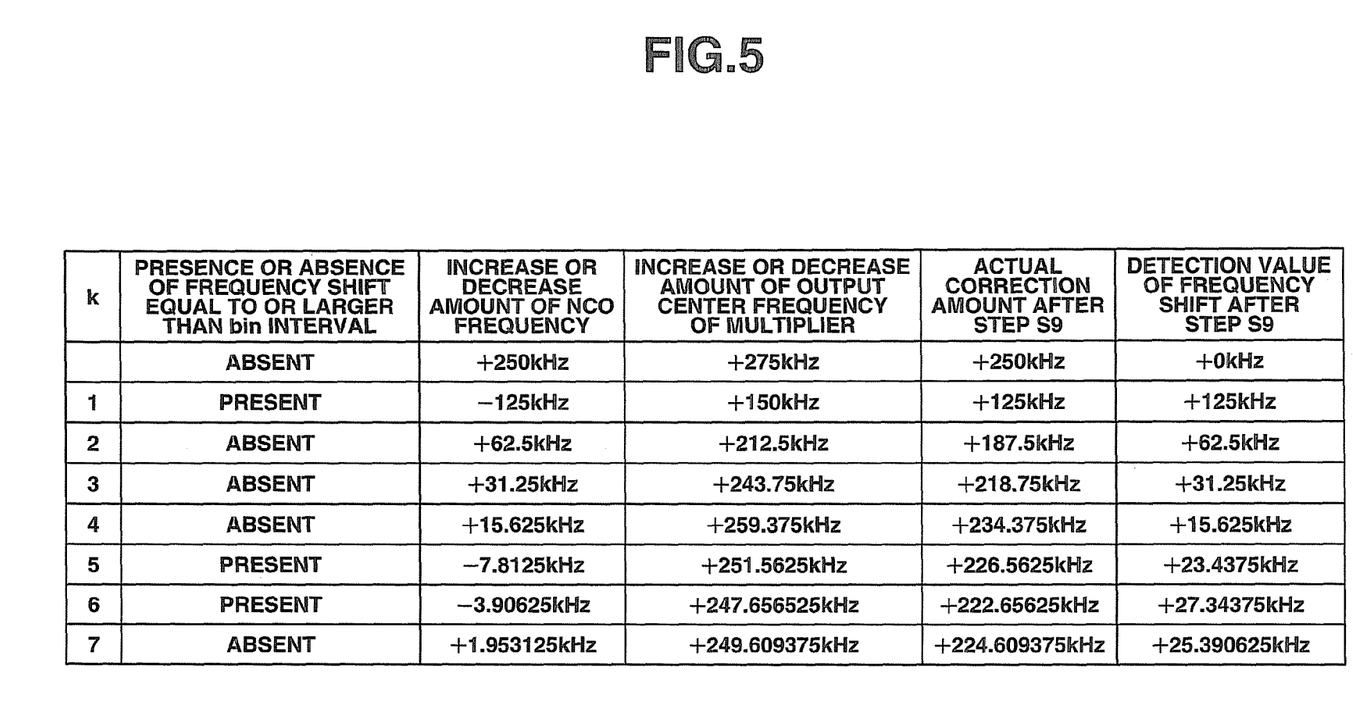
FIG. 5 is a table for explaining operation of the embodiment.

FIG. 5 is a table for explaining operation performed with the initial value φ0 set to +250 kHz when the number of points of the Fourier transform unit 21 is 64 and the bin interval is 250 kHz. FIG. 5 shows an example in which the actual carrier frequency shift Δf is +25 kHz.

A first section from the top of FIG. 5 indicates a result in step S9. Specifically, when the frequency shift equal to or larger than 1 bin interval is not detected in step S5, the controller 29 instructs the NCO 28 to increase the oscillation frequency by +250 kHz. As a result, an actual correction amount after step S9 is the correction amount in step S6+250 kHz (hereinafter simply referred to as +250 kHz). The center frequency of the output of the multiplier 12 is the predetermined carrier frequency+275 kHz (hereinafter simply referred to as +275 kHz). At this point, the frequency shift based on the processing in step S9 is not detected.

As a result of the processing in step S9, a frequency shift is detected with respect to the output of the multiplier 12. A comparison result of the comparator 26 in step S14 indicates that the frequency shift is present. The controller 29 determines an increase or decrease value φ of the frequency set in the NCO 28 according to the following Equation (2). The controller 29 outputs the increase or decrease value φ to the NCO 28 and the frequency error estimating unit 27.

$$\phi = \phi 0/2^k \text{(frequency shift is absent)}$$

$$\phi = -\phi 0/2^k \text{(frequency shift is present)} \qquad (2)$$

Specifically, since the frequency shift is present at this point, the controller 29 set the oscillation frequency of the NCO 28 to (the oscillation frequency to that point−125 kHz). Consequently, the center frequency of the output of the multiplier 12 falls to +150 kHz. A correction amount for a frequency by the NCO 28 after step S9 is +125 kHz. If the detection of a frequency shift is ended at this point, the frequency shift is estimated as +125 kHz.

In step S18, the controller 29 determines whether the number of times of repetition k exceeds a predetermined number of times. When the number of times of repetition k does not exceed the predetermined number of times, the controller 29 advances the processing to step S19 and k is incremented. Thereafter, the controller 29 repeats the processing in steps S11 to S19 until the number of times of repetition k reaches the predetermined number of times.

Every time the detection of a frequency shift is repeated, the increase or decrease value of the frequency set in the NCO 28 decreases to a smaller value and the correction amount converges on the actual frequency shift. FIG. 5 indicates that the correction amount is +224.609375 kHz when k is 7. In the example shown in FIG. 5, the output of the multiplier 12 converges on 250 kHz. This means that it is possible to detect a frequency error with desired resolution by setting k according to detection accuracy requested by a system.

It is assumed that the detection of a frequency shift is performed until k reaches 7. When k reaches 7, the controller 29 advances the processing from step S18 to step S19 and causes the switch SW to select an output of the frequency error estimating unit 27. The frequency error estimating unit 27 sets a cumulative value of increase or decrease values φ after step S9, i.e., (250−an actual correction amount after step S9) as a detection value of a frequency shift after step S9. The frequency error estimating unit 27 adds up the correction value in step S6 and the detection value of the frequency shift after step S9 to calculate a frequency shift. In the example shown in FIG. 5, the correction value in step S6 is 0. The frequency error estimating unit 27 outputs +25.390625 kHz to the NCO 28 as an estimation result of a frequency error.

Thereafter, the NCO 28 oscillates at a frequency having the frequency error estimated by the frequency error estimating unit 27. Consequently, the multiplier 12 shifts the frequency of the received signal by −25.390625 kHz and outputs the received signal. Since the actual frequency error Δf is 25 kHz, a detection error in the example shown in FIG. 5 is 0.390625 kHz. It means that sufficient detection accuracy is obtained.

In the present embodiment, in steps S9, S16, and S17, the frequency correction is performed eight times in total. Since the number of points is 64, it is possible to perform the frequency error detection by capturing data of 512 samples. On the other hand, in order to perform the frequency error detection at the same accuracy as that shown in FIG. 5 using the related art, about 4096 points are necessary as the number of points of the Fourier transform circuit. Data of 4096 samples needs to be captured. In this way, in the present embodiment, high-speed frequency acquisition is possible compared with the related art. When estimation of a frequency error is wrong, since time required for input and output of the Fourier transform unit is predominant in time required for acquiring a frequency, acquisition time can be reduced compared with the related art.

As explained above, in the present embodiment, when the frequency error detection by the spectrum analysis method not requiring a known signal is performed, the Fourier transform unit having a small number of points is adopted and detection of a frequency shift is repeated while frequency correction is performed. In this case, a correction amount of the frequency correction is caused to converge on the frequency shift by repeating an increase or decrease of the correction amount while reducing the correction amount. This makes it possible to adopt a Fourier transform unit having a small circuit size and perform high precision frequency error detection. Since the circuit size of the Fourier transform unit is small, fast frequency acquisition is possible.

The multiplier 12 for frequency correction may also be used as a frequency converter configured to convert a received signal in a high frequency band into a baseband signal. In this case, an LPF (Low Pass Filter), an interpolator, and the like are attached to a post-stage of the frequency converter. However, a basic configuration and an algorithm are the same as those in the embodiment. By adopting such a configuration, it is unnecessary to provide multipliers separately for frequency conversion and frequency correction and the circuit size can be reduced. In the embodiments, a digital circuit is assumed. However, analog circuits such as a VCO and a mixer may be used instead of the NCO and the multiplier that generate a sine wave in order to correct a frequency error.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A frequency error detecting circuit comprising:
an oscillator configured to output a frequency-variable oscillation output;
a frequency converting unit configured to frequency-convert a frequency of a received signal on the basis of the oscillation output and output the received signal;
a time-to-frequency converting unit configured to convert the output of the frequency converting unit from a time domain signal into a frequency domain signal including plural frequency components;
a frequency shift determining unit configured to determine, on the basis of an output of the time-to-frequency converting unit, presence or absence of a frequency shift between an output frequency of the frequency converting unit and a predetermined carrier frequency; and
a control unit configured to repeat frequency conversion processing of the frequency converting unit and conversion processing of the time-to-frequency converting unit while controlling an oscillation frequency of the oscillator on the basis of a determination result of the frequency shift determining unit and cause the output frequency of the frequency converting unit to converge on a predetermined value to thereby detect a frequency error between the frequency of the received signal and the predetermined carrier frequency on the basis of the oscillation frequency of the oscillator.

2. The frequency error detecting circuit according to claim 1, wherein the control unit increases or decreases, in every determination of the frequency shift determining unit, the oscillation frequency of the oscillator and reduces an increase or decrease amount on the basis of the determination result to thereby cause the output frequency of the frequency converting unit to converge on the predetermined value.

3. The frequency error detecting circuit according to claim 2, wherein the control unit reduces the increase or decrease amount of the oscillation frequency of the oscillator to a half in every determination of the frequency shift determining unit.

4. The frequency error detecting circuit according to claim 1, wherein a frequency error among the frequency components of the frequency domain signal output by the time-to-frequency converting unit is larger than the frequency error detected by the control unit.

5. The frequency error detecting circuit according to claim 1, wherein the control unit determines the number of times of the determination of the frequency shift determining unit according to frequency resolution of the frequency error detection.

6. The frequency error detecting circuit according to claim 1, wherein the frequency shift determining unit determines presence or absence of the frequency shift according to comparison of the frequency domain signal concerning the output of the frequency converting unit and a frequency domain signal concerning a predetermined carrier.

7. The frequency error detecting circuit according to claim 6, wherein
the frequency shift determining unit includes:
a signal existence determining unit configured to determine, according to whether values of the plural frequency components from the time-to-frequency converting unit are larger than a predetermined threshold, presence or absence of a signal for each of the frequency components;
a spectrum edge position determining unit configured to calculate, according to a boundary position of signal presence or absence of the frequency components obtained from a determination result of the signal existence determining unit, a center frequency of the output of the frequency converting unit in a unit of the frequency component; and
a comparing unit configured to determine presence or absence of the frequency shift according to comparison of the center frequency in the unit of the frequency component calculated by the spectrum edge position determining unit and a center frequency in the unit of the frequency component calculated from the frequency domain signal concerning the predetermined carrier.

8. The frequency error detecting circuit according to claim 7, wherein the control unit determines an initial value of an increase or a decrease in the oscillation frequency of the oscillator according to the number of points of the time-to-frequency converting unit, a signal band of the received signal, and the predetermined threshold used by the signal existence determining unit.

9. The frequency error detecting circuit according to claim 6, wherein the frequency shift determining unit determines the frequency shift after changing, for each of the plural frequency components, the frequency domain signal from the time-to-frequency converting unit to an absolute value and cumulatively adding up the absolute value.

10. The frequency error detecting circuit according to claim 1, wherein the received signal is oversampled.

11. A frequency correcting circuit comprising:
an oscillator configured to output a frequency-variable oscillation output;
a frequency converting unit configured to frequency-convert a frequency of a received signal on the basis of the oscillation output and output the received signal;
a time-to-frequency converting unit configured to convert the output of the frequency converting unit from a time domain signal into a frequency domain signal including plural frequency components;
a frequency shift determining unit configured to determine, on the basis of an output of the time-to-frequency converting unit, presence or absence of a frequency shift between an output frequency of the frequency converting unit and a predetermined carrier frequency; and
a control unit configured to repeat, in a frequency error detection period, frequency conversion processing of the frequency converting unit and conversion processing of the time-to-frequency converting unit while controlling an oscillation frequency of the oscillator on the basis of a determination result of the frequency shift determining unit and cause the output frequency of the frequency converting unit to converge on a predetermined value to thereby detect a frequency error between the frequency of the received signal and the predetermined carrier frequency on the basis of the oscillation frequency of the oscillator, and, during a tracking period, control the oscillation output on the basis of the detected frequency error to thereby cause the frequency converting unit to output an output with the frequency shift corrected.

12. The frequency correcting circuit according to claim 11, wherein the control unit increases or decreases, in every determination of the frequency shift determining unit, the oscillation frequency of the oscillator and reduces an increase or decrease amount on the basis of the determination result to thereby cause the output frequency of the frequency converting unit to converge on the predetermined value.

13. The frequency correcting circuit according to claim 12, wherein the control unit reduces the increase or decrease amount of the oscillation frequency of the oscillator to a half in every determination of the frequency shift determining unit.

14. The frequency correcting circuit according to claim 11, wherein the control unit determines the number of times of the determination of the frequency shift determining unit according to frequency resolution of the frequency error detection.

15. The frequency correcting circuit according to claim 11, wherein the frequency shift determining unit determines presence or absence of the frequency shift according to comparison of the frequency domain signal concerning the output of the frequency converting unit and a frequency domain signal concerning a predetermined carrier.

16. A frequency error detecting method comprising:
    subjecting a frequency of a received signal to frequency conversion processing on the basis of an oscillation output from an oscillator;
    subjecting the received signal subjected to the frequency conversion processing to time-to-frequency conversion processing to convert the received signal from a time domain signal into a frequency domain signal;
    determining, on the basis of the frequency domain signal, presence or absence of a frequency shift between an output frequency of the received signal after the frequency conversion processing and a predetermined carrier frequency; and
    repeating the frequency conversion processing and the time-to-frequency conversion processing while controlling an oscillation frequency of the oscillator on the basis of a determination result of presence or absence of the frequency shift and causing the output frequency of the received signal after the frequency conversion processing to converge on a predetermined value to thereby detect a frequency error between the frequency of the received signal and the predetermined carrier frequency on the basis of the oscillation frequency of the oscillator.

17. The frequency error detecting method according to claim 16, further comprising increasing or decreasing, in every determination of the presence or absence of the frequency shift, the oscillation frequency of the oscillator and reducing an increase or decrease amount on the basis of the determination result to thereby cause the output frequency of the frequency conversion processing to converge on the predetermined value.

18. The frequency error detecting method according to claim 17, further comprising reducing the increase or decrease amount of the oscillation frequency of the oscillator to a half in every determination of the presence or absence of the frequency shift.

19. The frequency error detecting method according to claim 16, further comprising determining the number of times of the determination of the presence or absence of the frequency shift according to frequency resolution of the frequency error detection.

20. The frequency error detecting method according to claim 16, further comprising determining the presence or absence of the frequency shift according to comparison of the frequency domain signal concerning the output by the frequency conversion processing and a frequency domain signal concerning a predetermined carrier.

* * * * *